July 5, 1938.  E. CHRISTIANSON  2,122,975

SLACK ADJUSTER FOR BRAKES

Filed Aug. 11, 1937  2 Sheets-Sheet 1

INVENTOR
Erling Christianson,
By Archworth Martin,
Attorney.

July 5, 1938.  E. CHRISTIANSON  2,122,975
SLACK ADJUSTER FOR BRAKES
Filed Aug. 11, 1937   2 Sheets-Sheet 2

INVENTOR.
Erling Christianson,
By Archworth Martin,
Attorney.

Patented July 5, 1938

2,122,975

UNITED STATES PATENT OFFICE 2,122,975

SLACK ADJUSTER FOR BRAKES

Erling Christianson, Hammond, Ind., assignor to Viking Engineering Company, Inc., Hammond, Ind., a corporation of Indiana Application August 11, 1937, Serial No. 158,466

15 Claims. (Cl. 188—197)

My invention relates to slack adjusters for railway brakes and the like, and has for one of its objects the provision of an improved means for taking up the slack in brake mechanisms, which results from wearing away of the brake shoes and from other causes, together with the provision of means for yieldably holding the adjusting members in their set positions.

Another object of my invention is to provide means for preventing rattling of the parts in the slack adjuster and the members associated therewith.

Figure 1:
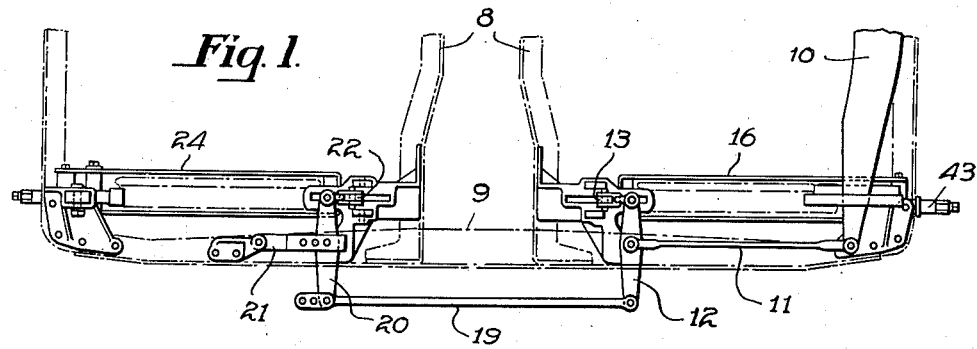
Figure 2:
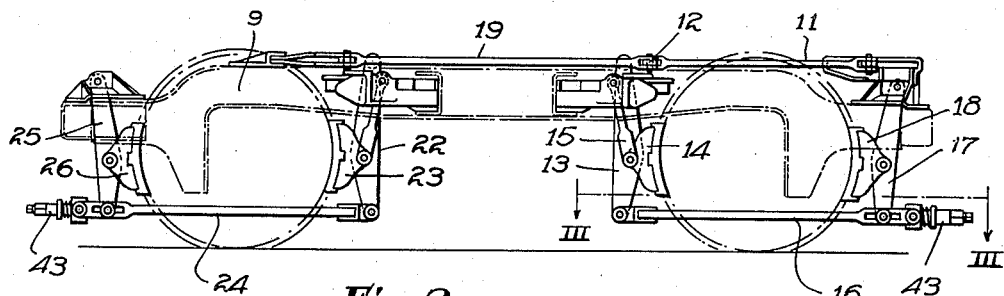
Figure 3:
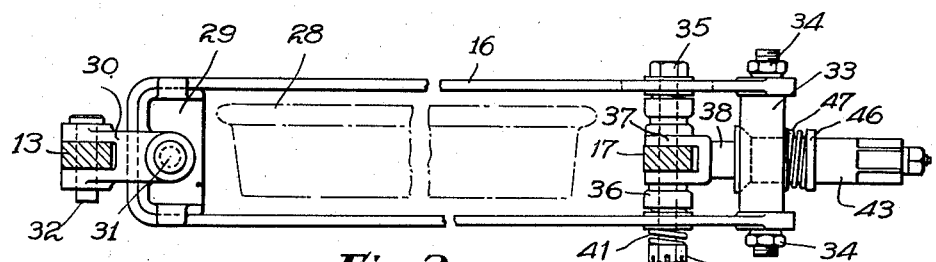
Figure 4:
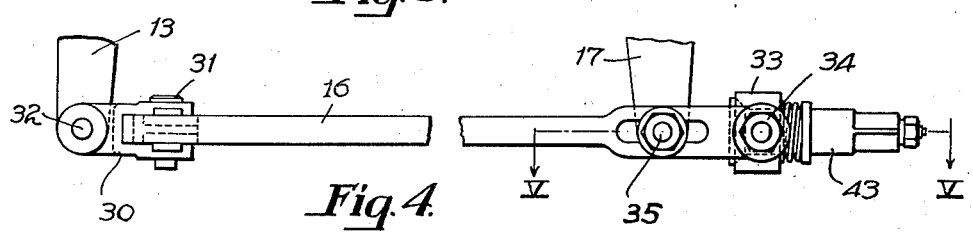
Figure 5:
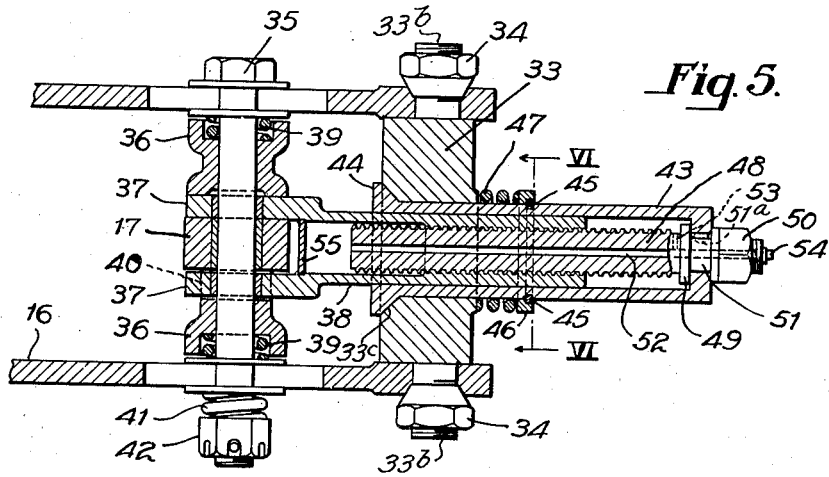
Figure 6:
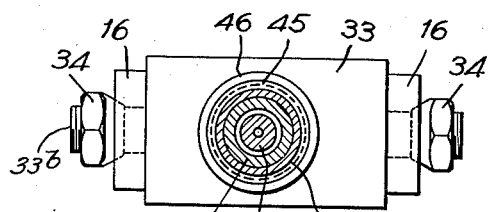
Figure 7:
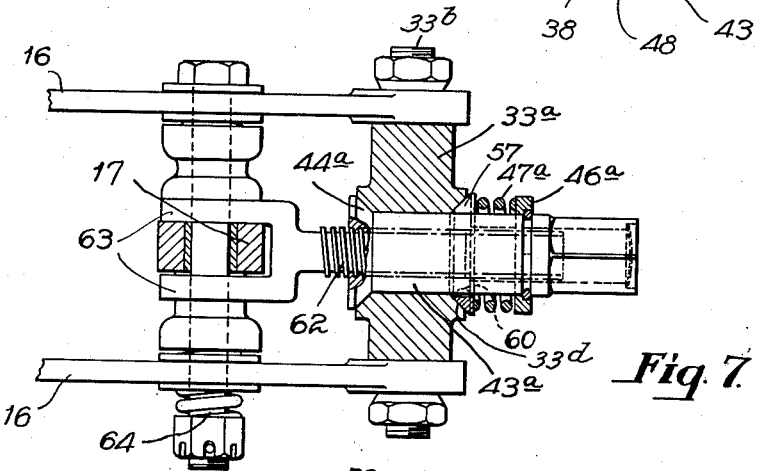
Figure 8:
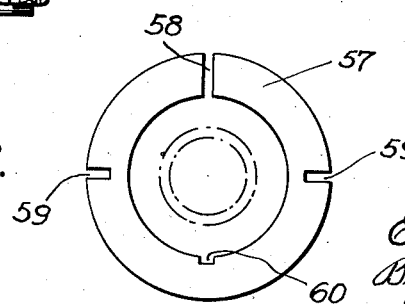

Some of the forms which my invention may take are shown in the accompanying drawings wherein Fig. 1 is a plan view of a portion of a railway car truck with my improvement applied thereto; Fig. 2 is a view thereof in side elevation; Fig. 3 is an enlarged view taken on the line III—III of Fig. 2; Fig. 4 is a side view of the slack adjuster; Fig. 5 is a view on an enlarged scale taken on the line V—V of Fig. 4; Fig. 6 is a view taken on the line VI—VI of Fig. 5; Fig. 7 is a view similar to Fig. 5 but showing a modification of such structure, and Fig. 8 is a view on an enlarged scale of one of the conical-faced collars of Fig. 7.

A portion of a truck frame is represented by the numeral 8, and a truck side frame by the numeral 9. An equalizing bar 10 through which braking force is applied to the brake rigging in a manner well known in the art, extends to the opposite side of the truck frame for connection to brake rigging which is a duplicate of that shown in Figs. 1 and 2. A pull rod 11 is connected at one end to the bar 10 and at its other end to a floating lever 12. The one end of the lever 12 is connected to the upper end of a live lever 13 which at its intermediate point has pivotal connection with a brake head 14. The brake head is suspended from the truck frame 9 by a hanger 15. At its lower end the brake lever 13 is connected to a tension member 16 that is in turn connected to the lower end of a dead lever 17 in a manner to be hereinafter more fully described. The lever 17 intermediate its ends is pivotally connected to a brake head 18 and its upper end to the side frame 9.

A link 19 connects the outer end of the floating lever 12 with a lever 20 that is pivotally connected intermediate its ends to a bracket 21 that is carried by the side frame 9. The inner end of the lever 20 is connected to a brake lever 22 that is connected intermediate its ends to a brake head 23 and at its lower end to a tension rod or yoke 24. The tension rod 24 is connected to a dead lever 25 that carries a brake head 26. The connection between the members 24 and 25 is of the same form as that between the members 16 and 17 and includes the slack adjuster to be hereinafter described.

Except for the slack adjuster elements, the parts above described are mainly of conventional form, and the operation thereof need not be explained in detail. It is merely a typical example of one of many brake systems with which my invention may be employed.

As slack or looseness develops in the brake rigging through wear of the parts, the excessive looseness or slack must be taken up in order to insure that there will be proper functioning of the brake mechanism. To this end I provide adjustable connections between the tension members 16 and 24 and the brake levers 17 and 25 respectively, details of one of such connections being shown in Figs. 3 to 6. The tension member 16 is of U-shape and straddles one of the car wheels 28. At its one end it carries a block 29 which in turn is connected with a double yoke 30, two of whose legs are connected to the block 29 by a pin 31. A pin 32 extends through the other legs of the yoke and serves as a pivot pin or shaft for the lower end of the brake lever 13.

At its other end, a cross head 33 is disposed between the legs of the member 16. The member 33 has threaded studs 33b that extend through the legs of the yoke 16, the parts being held in assembled relation by nuts 34 that have threaded engagement with said studs. A bolt 35 extends through elongated slots in the legs of the yoke 16 and through the lower end of the brake lever 13, the bolt 35 serving as a pivot pin for the brake lever and being adjustable longitudinally of the yoke 16 by means of adjustable members that are carried by the cross head 33. Spacer sleeves or collars 36 are assembled on the bolt 35 between the legs of the yoke 16 and yoke-like extensions 37 of an adjustable sleeve 38. Compression springs 39 are interposed between the sleeves 36 and the legs of the yoke to prevent rattling of the parts. One of the sleeves 36 has its reduced end 40 (Fig. 5) extending through one leg of the yoke extensions 37 and bears against one side of the brake lever 13, while the other sleeve has engagement with the outer face of the other yoke extension 37. A spring 41 is positioned between one leg of the yoke 16 and a nut 42 that holds the bolt 35 in place.

A bearing sleeve 43 surrounds the sleeve 38 and extends through the cross head 33. The inner end of the sleeve 43 is enlarged at 44 to provide a bearing surface of frusto-conical form that engages a complementary-shaped depression or seat 33c in the cross head 33. The sleeve 43 is provided with a circumferentially-extending keyslot for the reception of two key members 45, each of which is of semi-circular form. A locking ring 46 is disposed circumferentially of the sleeve 43 and is recessed in its outer face so that it will overlie the key members 45. It will be held by said key members against movement outwardly along the sleeve 43 and will in turn hold the key members in their slots. A spring 47 is interposed between the ring 46 and the adjacent face of the cross head 33 to maintain the head 44 of the sleeve 43 in snug frictional engagement with the cross head 33, so as to prevent idle rotation of the sleeve 43.

The sleeve 38 is internally threaded for engagement with an adjusting screw which is rigidly secured at its outer end in the wall of the sleeve 43, the members being held in assembled relation by a collar or shoulder 49 formed on the screw and a clamping nut 50. The reduced portion 51 of the screw will be suitably keyed at 51a to hold the screw against rotation in the sleeve 43. The screw 48 is apertured throughout its length, the outer end of this aperture 52 being closed by a screw plug 54. Through this aperture and a radially-extending aperture 53 grease can be forced into the sleeves 38 and 43. The inner end of the sleeve 38 is closed by a plug or plate 55. The periphery of the sleeve 43 is for a portion of its length polygonally faced, as shown in Fig. 3, so that it can be conveniently turned by a wrench.

When it is desired to take up slack in the brake rigging, the sleeve 43 is turned, together with the screw 48. The sleeve 38 is held against turning by reason of its yoke connection at 37 with the bolt 35. It will be seen that through turning of the screw 48, the sleeve 38 will be shifted longitudinally of its axis, thus effecting adjustments of the lower ends of the brake levers 17 and 13 relative to one another. The frictional force developed between the enlarged head 44 and the conical seat in the cross head 33 through the pressure of the spring 47, holds the sleeve 43 and consequently the screw 48 against accidental or idle turning movement. Also, the tension of the spring 47 will prevent rattling of the parts. When it is desired to remove the parts from the cross head 33, the ring 46 will be depressed against the spring 47 to permit removal of the keys 45.

Referring now to Figs. 7 and 8, I show a structure wherein there is a modification of certain of the parts shown in Fig. 5. In this case, the cross head 33a is provided with a seat 33d of frusto-conical contour in its outer face, against which a friction ring 57 has seating engagement. The ring 57 is slit at 58 and slotted at 59, to weaken it and permit radial compression thereof, so that when it is forced into its seat it will contract to frictionally grip the bearing sleeve 43a, thus supplementing the friction provided by the enlarged head 44a of the sleeve to resist accidental turning movement of the sleeve. The friction ring 57 is slidably keyed at 60 to the sleeve 43a. A spring 47a is interposed between the ring 57 and the locking ring 46a and is of sufficient strength to effect radial contraction of the ring 57. It will be seen that with the two frusto-conical bearing surfaces of Fig. 7, there is greater frictional resistance to idle turning movement of the sleeve 43a than there is to turning movement of the sleeve 43 of Fig. 5. In this structure, a screw 62 has threaded engagement with the sleeve 43a and has direct connection through its forked extensions 63 with the pivot pin or bolt 64 that extends through the brake lever 13. Turning movement of the sleeve 43a will effect adjustment of the brake lever relative to the tension member 16.

From the foregoing, it will be seen that not only is provision effectively made for adjusting the slack and for maintaining the adjusting parts against accidental shifting, but that there is economy of manufacture in that the parts need not be made with very great accuracy of fit, since the conical surfaces and the springs will take up or compensate for inaccuracy of fit or looseness.

I claim as my invention:

1. The combination with a pair of brake levers and mechanism for operating one of said levers, of a bar connected at one end to one of the levers, a cross head carried by the other end of the bar and having a recess of frusto-conical form in one side thereof, a sleeve extending through said cross head and having one end thereof enlarged to generally frusto-conical form and seating in said recess, a spring having inter-engagement with said sleeve and the cross head and serving to maintain said frusto-conical surfaces in frictional engagement with one another, and a screw-threaded connecting device between said sleeve and the other brake lever, so arranged that upon rotation of the sleeve the last-named brake lever will be shifted longitudinally of the said bar.

2. The combination with a pair of brake levers and mechanism for operating one of said levers, of a bar connected at one end to one of the levers, a cross head carried by the other end of the bar and having a recess of frusto-conical form in one side thereof, a sleeve extending through said cross head and having one end thereof enlarged to generally frusto-conical form and seating in said recess, a spring having interengagement with said sleeve and the cross head and serving to maintain said frusto-conical surfaces in frictional engagement with one another, a screw disposed within the sleeve and rigidly connected thereto, and a second sleeve connected at one end to the other brake lever and having screw-threaded engagement with the said screw.

3. The combination with a pair of brake levers and mechanism for operating one of said levers, of a bar connected at one end to one of the levers, a cross head carried by the other end of the bar and having a recess of frusto-conical form in one side thereof, a sleeve extending through said cross head and having one end thereof enlarged to generally frusto-conical form and seated in said recess, a spring having inter-engagement with said sleeve and the cross head and serving to maintain said frusto-conical surfaces in frictional engagement with one another, a screw disposed within the sleeve and rigidly connected thereto, and a second sleeve connected at one end to the other brake lever and having screw-threaded engagement with the said screw, the second-named sleeve extending into the first-named sleeve.

4. The combination with a pair of brake levers and mechanism for operating one of said levers, of a bar connected at one end to one of the levers, a cross head carried by the other end of the bar and having a recess of frusto-conical form in one side thereof, a sleeve extending through said cross head and having one end thereof enlarged to generally frusto-conical form and seated in said recess, a spring having inter-engagement with said sleeve and the cross head and serving to maintain said frusto-conical surfaces in frictional engagement with one another, a screw disposed within the sleeve and rigidly connected thereto, a second sleeve connected at one end to the other brake lever and having screw-threaded engagement with the said screw, the second-named sleeve extending into the first-named sleeve, and means for introducing lubricant through the end of said screw and into the sleeves.

5. The combination with a pair of brake levers and mechanism for operating one of said levers, of a bar connected at one end to one of the levers, a cross head carried by the other end of the bar and having recesses in its opposite sides of frusto-conical form, a sleeve extending through said cross head and having an enlarged head of frusto-conical form seating within the said recess, a friction ring of frusto-conical form surrounding the sleeve and seating within the other frusto-conical recess, a stop shoulder on said sleeve, a spring interposed between said shoulder and the ring and serving to frictionally hold said ring in its seated position and to urge the sleeve axially in a direction to maintain the said frusto-conical enlargement against its seat, and a screw-threaded connecting device between said sleeve and the other brake lever, so arranged that upon rotation of the sleeve the last-named brake lever will be shifted longitudinally of the said bar.

6. The combination with a pair of brake levers and mechanism for operating one of said levers, of a bar connected at one end to one of the levers, a cross head carried by the other end of the bar and having recesses in its opposite sides of frusto-conical form, a sleeve extending through said cross head and having an enlarged head of frusto-conical form seating within the said recess, a friction ring of frusto-conical form surrounding the sleeve and seating within the other frusto-conical recess, a stop shoulder on said sleeve, a spring interposed between said shoulder and the ring and serving to frictionally hold said ring in its seated position and to urge the sleeve axially in a direction to maintain the said frusto-conical enlargement against its seat, and a screw-threaded connecting device between said sleeve and the other brake lever, so arranged that upon rotation of the sleeve the last-named brake lever will be shifted longitudinally of the said bar, the said ring being split so that it will be compressed radially by said spring, into frictional engagement with the sleeve under spring pressure.

7. The combination with a pair of brake levers and mechanism for operating one of said levers, of a bar connected at one end to one of the levers, a cross head carried by the other end of the bar and having recesses in its opposite sides of frusto-conical form, a sleeve extending through said cross head and having an enlarged head of frusto-conical form seating within the said recess, a friction ring of frusto-conical form surrounding the sleeve and seating within the other frusto-conical recess, a stop shoulder on said sleeve, a spring interposed between said shoulder and the ring and serving to frictionally hold said ring in its seated position and to urge the sleeve axially in a direction to maintain the said frusto-conical enlargement against its seat, and a screw-threaded connecting device between said sleeve and the other brake lever, so arranged that upon rotation of the sleeve the last-named brake lever will be shifted longitudinally of the said bar, the said ring being split so that it will be compressed radially by said spring, into frictional engagement with the sleeve under spring pressure, and being slidably keyed to the sleeve.

8. The combination with a pair of brake levers and mechanism for operating one of said levers, of a yoke connected at one end to one of the levers, a cross head disposed between the legs of the yoke adjacent to the other end thereof, a pivot pin extending through the other lever and the legs of the yoke and supported for slidable movement longitudinally of the yoke, a sleeve extending through the cross head and having an enlarged end engaging the inner side of the cross head, a second sleeve having a forked end connected to said pivot pin and extending into the first-named sleeve, a screw rigidly connected with the first-named sleeve and having screw-threaded engagement with the inner wall of the second-named sleeve, and means for maintaining said enlarged end of the first-named sleeve in seating engagement with the cross head, whereby upon turning of the first-named sleeve, the second-named sleeve and the second-named brake lever will be shifted longitudinally of the said yoke.

9. The combination with a pair of brake levers and mechanism for operating one of said levers, of a yoke connected at one end to one of the levers, a cross head disposed between the legs of the yoke adjacent to the other end thereof, a pivot pin extending through the other lever and the legs of the yoke and supported for slidable movement longitudinally of the yoke, a sleeve extending through the cross head and having an enlarged end engaging the inner side of the cross head, a second sleeve having a forked end connected to said pivot pin and extending into the first-named sleeve, a screw rigidly connected with the first-named sleeve and having screw-threaded engagement with the inner wall of the second-named sleeve, means for maintaining said enlarged end of the first-named sleeve in seating engagement with the cross head, whereby upon turning of the first-named sleeve, the second-named sleeve and the second-named brake lever will be shifted longitudinally of the said yoke, and means for introducing lubricant through said screw into the sleeves.

10. The combination with a pair of brake levers and mechanism for operating one of said levers, of a yoke connected at one end to one of the levers, a cross head disposed between the legs of the yoke adjacent to the other end thereof, a pivot pin extending through the other lever and the legs of the yoke and supported for slidable movement longitudinally of the yoke, a sleeve extending through the cross head and having an enlarged end engaging the inner side of the cross head, a second sleeve having a forked end connected to said pivot pin and extending into the first-named sleeve, a screw having threaded engagement with the second sleeve and extending through the outer end of the first-named sleeve and rigidly connected thereto, and means for maintaining said enlarged end of the first-named sleeve in seating engagement with the cross head, whereby upon turning of the first-named sleeve, the second-named sleeve and the second-named brake lever will be shifted longitudinally of the said yoke.

11. A slack adjuster for connecting the ends of brake levers or the like, comprising a connecting bar having laterally-spaced legs connected at one end to one of the levers, means for slidably connecting the other lever to the other end of said legs, a cross head disposed between the said legs, a sleeve extending through the cross head and frictionally held against turning movement therein, a sleeve connected to the second-named brake lever and extending into the first-named sleeve, and a screw-threaded connection between the said sleeves whereby upon turning movement of the first-named sleeve the other sleeve and the second-named brake lever will be shifted longitudinally of the said legs.

12. A slack adjuster for connecting the ends of brake levers or the like, comprising a connecting bar having laterally-spaced legs connected at one end to one of the levers, means for slidably connecting the other lever to the other end of said legs, a cross head disposed between the said legs, a sleeve extending through the cross head and frictionally held against turning movement therein, a sleeve connected to the second-named brake lever and extending into the first-named sleeve, and a screw connected to the first-named sleeve and having screw-threaded engagement with the interior of the second-named sleeve, whereby upon turning of the first-named sleeve the inner sleeve and the second-named brake lever will be adjusted longitudinally of the said legs.

13. A slack adjuster for connecting the ends of brake levers or the like, comprising a connecting bar having laterally-spaced legs connected at one end to one of the levers, means for slidably connecting the other lever to the other end of said legs, a cross head disposed between the said legs, a sleeve extending through the cross head and frictionally held against turning movement therein, a sleeve connected to the second-named brake lever and extending into the first-named sleeve, and a screw connected to the first-named sleeve and having screw-threaded engagement with the interior of the second-named sleeve, whereby upon turning of the first-named sleeve the inner sleeve and the second-named brake lever will be adjusted longitudinally of the said legs, the said screw extending through the outer end of the first-named sleeve and having an axially-extending passageway through which lubricant can be introduced into the second-named sleeve.

14. A slack adjuster for connecting the ends of brake levers or the like, comprising a connecting bar having laterally-spaced legs connected at one end to one of the levers, means for slidably connecting the other lever to the other end of said legs, a cross head disposed between the said legs, a sleeve extending through the cross head and frictionally held against turning movement therein, a sleeve connected to the second-named brake lever and extending into the first-named sleeve, and a screw connected to the first-named sleeve and having screw-threaded engagement with the interior of the second-named sleeve, whereby upon turning of the first-named sleeve the inner sleeve and the second-named brake lever will be adjusted longitudinally of the said legs, the said screw extending through the outer end of the first-named sleeve and having axially- and radially-extending passageways through which lubricant can be introduced into the said sleeves.

15. A slack adjuster for connecting the ends of brake levers or the like, comprising a connecting bar having laterally-spaced legs connected at one end to one of the levers, a pivot member extending through the said legs and the other lever and slidably supported on the said legs, yieldable elements interposed between the sides of the last-named lever and the adjacent sides of the legs, a cross head interposed between the said legs, a sleeve extending through the cross head, means for frictionally and yieldably holding the sleeve against idle rotative movement in the cross head, and a screw-threaded connection between the said sleeve and the said pivot member, whereby upon rotative movement of the sleeve the pivot member and the brake lever will be shifted longitudinally of the said legs.

ERLING CHRISTIANSON.